May 25, 1965

W. G. ROVANG ETAL 3,185,436

DIGESTER CAPPING VALVE

Filed Nov. 13, 1961

Wallace G. Rovang
Albert F. Laurie
INVENTORS

BY

Atty.

3,185,436
DIGESTER CAPPING VALVE

Wallace G. Rovang, 1825 NE. Marine Drive, and Albert F. Laurie, 7429 N. Chase Ave., both of Portland, Oreg.
Filed Nov. 13, 1961, Ser. No. 151,729
3 Claims. (Cl. 251—172)

This invention relates to valves. It pertains particularly to heavy duty cap valves used on pressure vessels such as papermill digesters, where conditions of high temperature, pressure, and caustic reagents prevail.

In one conventionally employed system for sealing papermill digesters the top of the digester is sealed with a cap, blind flange and gasket, all bolted together to seal off the digester. This arrangement has the disadvantage that after each cook it is necessary to wait for the steam pressure in the digester to drop before releasing the cap. This requires about 20 minutes and materially adds to the cost of the operation, especially in view of the very substantial cost of the digester, since it must be repeated about four times a day. Also, two men are required to do the work and the gasket must be renewed after each cook, further increasing the cost of the procedure.

In another system the digester is sealed off with a valve of the knife-gate type provided with packing. In this system the chemical content of the digester tends to cook on the top surface of the gate, creating a crust which adheres tightly, causing inefficient operation of the valve. As a result, the valve leaks, disagreeable and noxious fumes escape from the digester, and the gate tends to shave away the seat in which it works, further aggravating the difficulty.

Accordingly the general object of this invention is to provide a capping valve for pressure vessels which overcomes the foregoing difficulties and which is tightly sealed by the pressure of the gases present within the pressure vessel on which it is used.

Figures 1, 2, 3:
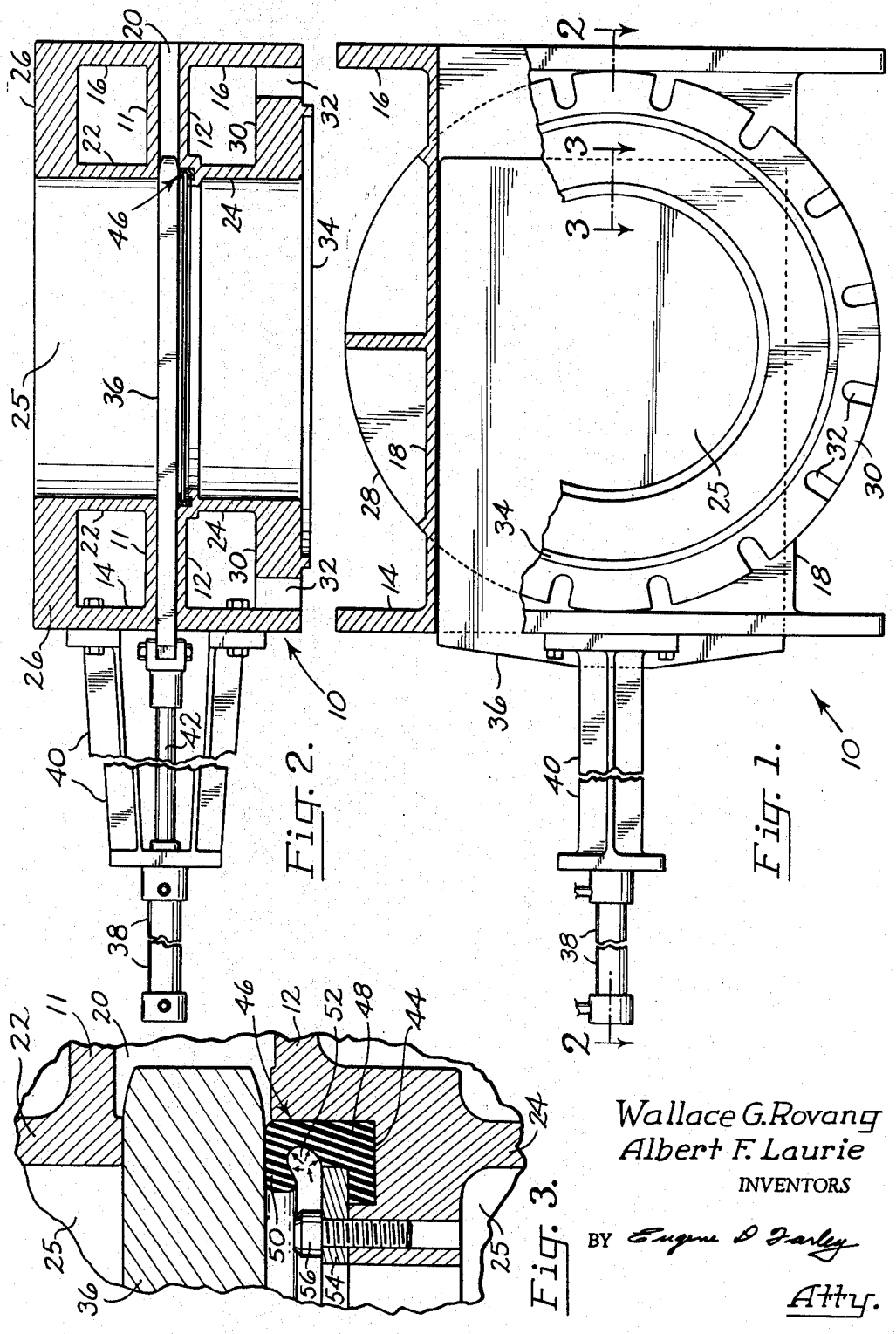
FIG. 1 is a bottom plan view of the herein described valve, partly broken away, better to illustrate the action of the valve.
FIG. 2 is a sectional view taken along line 2—2 of FIG. 1.
FIG. 3 is an enlarged, detail, fragmentary view taken along line 3—3 of FIG. 1 and illustrating particularly the sealing means associated with the valve.

Generally considered, the herein described cap valve comprises a body having a passageway longitudinally therethrough and a gateway transversely therethrough, intersecting the passageway. Means are provided for fastening the body to a pressure vessel with the passageway communicating with the interior of the vessel.

A gate works in the gateway and a seat is arranged peripherally about the interior of the passageway adjacent the gateway on the upstream side. A resilient sealing member is positioned in the seat, in contact with the gate. This member is provided with a pocket which communicates with the interior of the pressure vessel. As a consequence, the gases contained in the latter exert a substantial pressure against the resilient sealing member, forcing it tightly against the under surface of the gate and creating a tight seal.

Considering the foregoing in greater detail and with particular reference to the drawings:

The presently described cap valve includes a body indicated generally at 10 formed basically of a rectangular envelope which provides a gateway and an annular opening or passageway which is intercepted by the gateway and which communicates with the pressure vessel which the valve is designed to cap.

The rectangular envelope is formed from top and bottom plates 11, 12, end plates 14, 16 and side plates 18. These create a gateway or guideway 20 which, it is to be noted, extends completely through the valve body from one side to the other.

A passageway 25 communicating with the interior of the pressure vessel is formed from aligned top and bottom conduit sections 22, 24, which normally are of substantial diameter and which are welded or otherwise fastened to plates 11, 12. A top flange 26 lies across the upper ends of plates 14, 16 and conduit section 22, while a bottom flange 30 lies across the lower ends of plates 14, 16 and conduit section 24.

Bottom flange 30 is provided with a plurality of spaced, radial notches 32 which are adapted to receive swing bolts or other means for fastening the valve body to the top of the digester or other pressure vessel with which it is associated. Bottom flange 30 also is provided with an annular tongue 34 which is concentric with aligned conduit sections 22, 24 and which cooperates with a groove on top of the pressure vessel, not illustrated, to form a sealed tongue and groove joint.

It is to be understood of course that although for convenience of description, the body is described above with reference to individual structural parts, it may be cast or otherwise formed as a single unit if desired.

A gate 36 works in gateway 20, as seen particularly in FIG. 1. The gate is a substantial rectangular member of sufficient length to span completely passageway 25 formed by aligned conduits 22, 24.

It may be operated to advantage by suitable motor means. In the illustrated form of the invention, it is operated by means of a hydraulic cylinder 38, supported by a yoke 40, bolted to the outside faces of plates 14, 16. The piston rod 42 of the cylinder is coupled to the end of the gate. If desired, however, an air cylinder, electric motor, or other motor means may be employed.

Sealing means are provided for sealing gate 36 and preventing the escape of gases from the pressure vessel even though substantial pressure is present in it. Such means are illustrated particularly in FIG. 3. As illustrated, there is provided an annular seat 44 inside or upstream from gate 36 at the junction between plate 12 and conduit 24.

Seated within the seat is a novel sealing element indicated generally at 46.

This element is fabricated from a plastic such as "Teflon" or other resilient, tough, corrosion-resistant material. It is formed with a stepped base segment 48 and an upper lip segment 50. The outer surface of the lip segment provides a bearing surface engaging the underside of gate 36.

The two segments are so arranged as to define a continuous pocket or recess 52. This is in direct communication with the pressure area circumscribed by conduit 24, behind gate 36, and hence with the interior of the pressure vessel to which the valve is attached. Accordingly the pressure of the vessel is transmitted to the surfaces which define the pocket. This in turn results in pressing the bearing surface of lip 50 tightly against the underside of gate 36. A tight seal thus is secured, the strength of the seal being increased with the increase in pressure exerted by the bases present within the reaction vessel.

To prevent unseating of sealing member 46, there may be provided appropriate securing means which in the illustrated form of the invention comprise a ring 54 which bears against the stepped base segment 48 of the sealing member. The ring is secured in position by means of spaced bolts 56.

Thus there is provided a cap valve for papermill digesters and other massive pressure vessels which is characterized by manifold advantages.

First, and foremost, the valve provides across the mouth of the pressure vessel a tight seal, the efficiency of which actually is increased with increase in pressure within the vessel.

Second, the seal is maintained even during prolonged use of the valve. This desirable result is attributable to the fact that it is located beneath the gate where it operates against the chemically scoured and cleaned under surface of the latter. In addition, it is located in an area free from deposits of pulp and chemicals which are baked on other areas of the valve body.

Third, the gateway is cleaned easily when the gate is withdrawn. This is made possible by the fact that it extends completely through the valve body so that an air hose or other cleaning means can be used to blow away chips or other debris which tend to accumulate.

Fourth, the valve is motor operated rapidly from a remote station, dispensing with the need of permitting the digester pressure to drop before opening, and dispensing also with a work force of at least two men required to unbolt and open the cap of the conventional digester.

Fifth, the sealing ring employed is corrosion resistant and possesses a long service life. However, it is readily accessible for servicing or replacement when necessary.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:
1. A cap valve for pressure vessels comprising:
   (a) a body having a passageway longitudinally therethrough and a gateway transversely therethrough intersecting the passageway;
   (b) a gate working in the gateway;
   (c) means for fastening the body to a pressure vessel with the passageway communicating with the interior of the vessel;
   (d) a seat arranged peripherally about the interior of the passageway adjacent the gateway on the upstream side thereof;
   (e) and a resilient sealing member comprising a base segment and a gate-contacting segment separated by a pocket communicating with the passageway on the upstream side of the gateway;
   (f) the base segment of the sealing member being dimensioned for reception in the seat; and
   (g) the pressure from the interior of the vessel being communicated to the pocket, thereby holding the resilient gate-contacting segment of the sealing member securely in sealing engagement with the gate.

2. The cap valve of claim 1 including a retaining ring bolted into the body and securing the base segment of the sealing member in the seat.

3. The cap valve of claim 1 wherein the gateway extends completely through the body, affording access for cleaning out the gateway when the gate is open.

References Cited by the Examiner
UNITED STATES PATENTS

| | | | |
|---|---|---|---|
| 2,366,520 | 1/45 | Griffith | 251—172 |
| 2,732,170 | 1/56 | Shand | 251—172 |
| 2,744,539 | 5/56 | Jones | 251—361 XR |
| 2,925,244 | 2/60 | Fox | 251—328 |
| 2,980,389 | 4/61 | Williams | 251—175 |
| 3,030,068 | 4/62 | Priese | 251—172 |

FOREIGN PATENTS

| | | |
|---|---|---|
| 770,775 | 3/57 | Great Britain. |
| 843,149 | 8/60 | Great Britain. |

LAVERNE D. GEIGER, *Primary Examiner.*

ISADOR WEIL, EMILE PAUL, *Examiners.*